US011685377B2

(12) United States Patent
Jang

(10) Patent No.: US 11,685,377 B2
(45) Date of Patent: Jun. 27, 2023

(54) APPARATUS FOR CONTROLLING AUTONOMOUS DRIVING OF A VEHICLE, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventor: Yon Jun Jang, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 168 days.

(21) Appl. No.: 17/029,359

(22) Filed: Sep. 23, 2020

(65) Prior Publication Data

US 2021/0309227 A1    Oct. 7, 2021

(30) Foreign Application Priority Data

Apr. 6, 2020  (KR) .................. 10-2020-0041714

(51) Int. Cl.
*B60W 30/18* (2012.01)
*B60W 60/00* (2020.01)
*B60W 40/04* (2006.01)

(52) U.S. Cl.
CPC ...... *B60W 30/18163* (2013.01); *B60W 40/04* (2013.01); *B60W 60/0017* (2020.02); *B60W 2420/42* (2013.01); *B60W 2420/52* (2013.01); *B60W 2554/20* (2020.02); *B60W 2554/4041* (2020.02)

(58) Field of Classification Search
None
See application file for complete search history.

(56) References Cited

U.S. PATENT DOCUMENTS

| | | | |
|---|---|---|---|
| 8,436,902 B2* | 5/2013 | Kuehnle | G01W 1/14 348/148 |
| 8,665,079 B2* | 3/2014 | Pawlicki | G08G 1/16 340/436 |
| 8,861,791 B2* | 10/2014 | You | G06V 20/647 382/104 |
| 9,536,155 B2* | 1/2017 | Takemae | B60R 1/00 |
| 10,345,822 B1* | 7/2019 | Parchami | G05D 1/0251 |
| 10,569,768 B2* | 2/2020 | Ishii | B60W 50/0205 |
| 11,024,051 B2* | 6/2021 | Gomezcaballero | G06T 7/73 |
| 11,034,364 B1* | 6/2021 | Narang | G01C 21/3461 |
| 2006/0132295 A1* | 6/2006 | Gern | B60Q 9/008 340/438 |
| 2011/0184605 A1* | 7/2011 | Neff | G05D 1/0088 701/25 |
| 2012/0288154 A1* | 11/2012 | Shima | G06T 7/174 382/103 |
| 2013/0151058 A1* | 6/2013 | Zagorski | G05D 1/0289 701/1 |

(Continued)

*Primary Examiner* — Jonathan M Dager
(74) *Attorney, Agent, or Firm* — Lempia Summerfield Katz LLC

(57) ABSTRACT

An apparatus for controlling autonomous driving of a vehicle includes a processor to control autonomous driving, and a storage to store data and an algorithm to control the autonomous driving. The processor determines whether a target vehicle in front of a host vehicle in a travelling lane of the host vehicle is stopped, and performs a passing control when the target vehicle is stopped.

17 Claims, 8 Drawing Sheets

(56) References Cited

U.S. PATENT DOCUMENTS

| | | | |
|---|---|---|---|
| 2014/0032049 A1* | 1/2014 | Moshchuk | G08G 1/166 701/42 |
| 2017/0291603 A1* | 10/2017 | Nakamura | B60W 30/095 |
| 2017/0329332 A1* | 11/2017 | Pilarski | B60W 30/095 |
| 2018/0074497 A1* | 3/2018 | Tsuji | G06V 20/59 |
| 2018/0233034 A1* | 8/2018 | Tachibana | G08G 1/052 |
| 2018/0267558 A1* | 9/2018 | Tiwari | G05D 1/0038 |
| 2019/0135291 A1* | 5/2019 | Sim | B60W 30/10 |
| 2019/0202451 A1* | 7/2019 | Hayamizu | B60W 50/14 |
| 2019/0213290 A1* | 7/2019 | Delva | G01M 17/007 |
| 2019/0276013 A1* | 9/2019 | Kim | G06V 20/588 |
| 2019/0291730 A1* | 9/2019 | Kamiya | G06V 20/58 |
| 2019/0294170 A1* | 9/2019 | Kazemi | G05D 1/0274 |
| 2019/0347879 A1* | 11/2019 | Motomura | G08G 1/16 |
| 2020/0023841 A1* | 1/2020 | Hayama | G01C 21/26 |
| 2020/0062245 A1* | 2/2020 | Samotsvet | G06T 7/60 |
| 2020/0064855 A1* | 2/2020 | Ji | B60R 1/00 |
| 2020/0066147 A1* | 2/2020 | Vadillo | G05D 1/104 |
| 2020/0139966 A1* | 5/2020 | Ito | B60W 10/18 |
| 2020/0150652 A1* | 5/2020 | Urano | B60W 50/082 |
| 2020/0198649 A1* | 6/2020 | Emura | G08G 1/16 |
| 2020/0231146 A1* | 7/2020 | Miyano | B60W 30/09 |
| 2020/0249684 A1* | 8/2020 | Onofrio | G05D 1/0088 |
| 2020/0257299 A1* | 8/2020 | Wang | G08G 1/167 |
| 2020/0355823 A1* | 11/2020 | Tingley | G01S 13/865 |
| 2021/0009117 A1* | 1/2021 | Emura | B60W 30/09 |
| 2021/0061270 A1* | 3/2021 | Parks | B60W 10/18 |
| 2021/0086768 A1* | 3/2021 | Komoguchi | G08G 1/16 |
| 2021/0107567 A1* | 4/2021 | Varunjikar | B62D 15/0265 |
| 2021/0129835 A1* | 5/2021 | Viehmann | B62D 9/005 |
| 2021/0129865 A1* | 5/2021 | Jeong | B60W 50/14 |
| 2021/0190536 A1* | 6/2021 | Gil Casals | G01C 21/3841 |
| 2021/0197852 A1* | 7/2021 | Fairfield | B60W 60/001 |
| 2021/0206389 A1* | 7/2021 | Kim | G01C 21/3415 |
| 2021/0237739 A1* | 8/2021 | Hayakawa | B60W 30/18163 |
| 2021/0276588 A1* | 9/2021 | Kabzan | B60W 60/0011 |
| 2021/0309217 A1* | 10/2021 | Kim | G08G 1/165 |
| 2022/0009522 A1* | 1/2022 | Zhang | B62D 15/0265 |
| 2022/0017079 A1* | 1/2022 | Kakeshita | B60W 10/20 |
| 2022/0017080 A1* | 1/2022 | Moriya | B60W 30/09 |
| 2022/0017081 A1* | 1/2022 | Yokoyama | G06F 18/23 |
| 2022/0048499 A1* | 2/2022 | Yang | B60W 10/18 |
| 2022/0063622 A1* | 3/2022 | Jumpertz | G08G 1/22 |
| 2022/0063664 A1* | 3/2022 | Liu | G08G 1/09626 |
| 2022/0073095 A1* | 3/2022 | Seitz | B60W 40/09 |
| 2022/0080977 A1* | 3/2022 | Ucar | G01S 13/931 |
| 2022/0105931 A1* | 4/2022 | Motegi | G06V 20/588 |

* cited by examiner

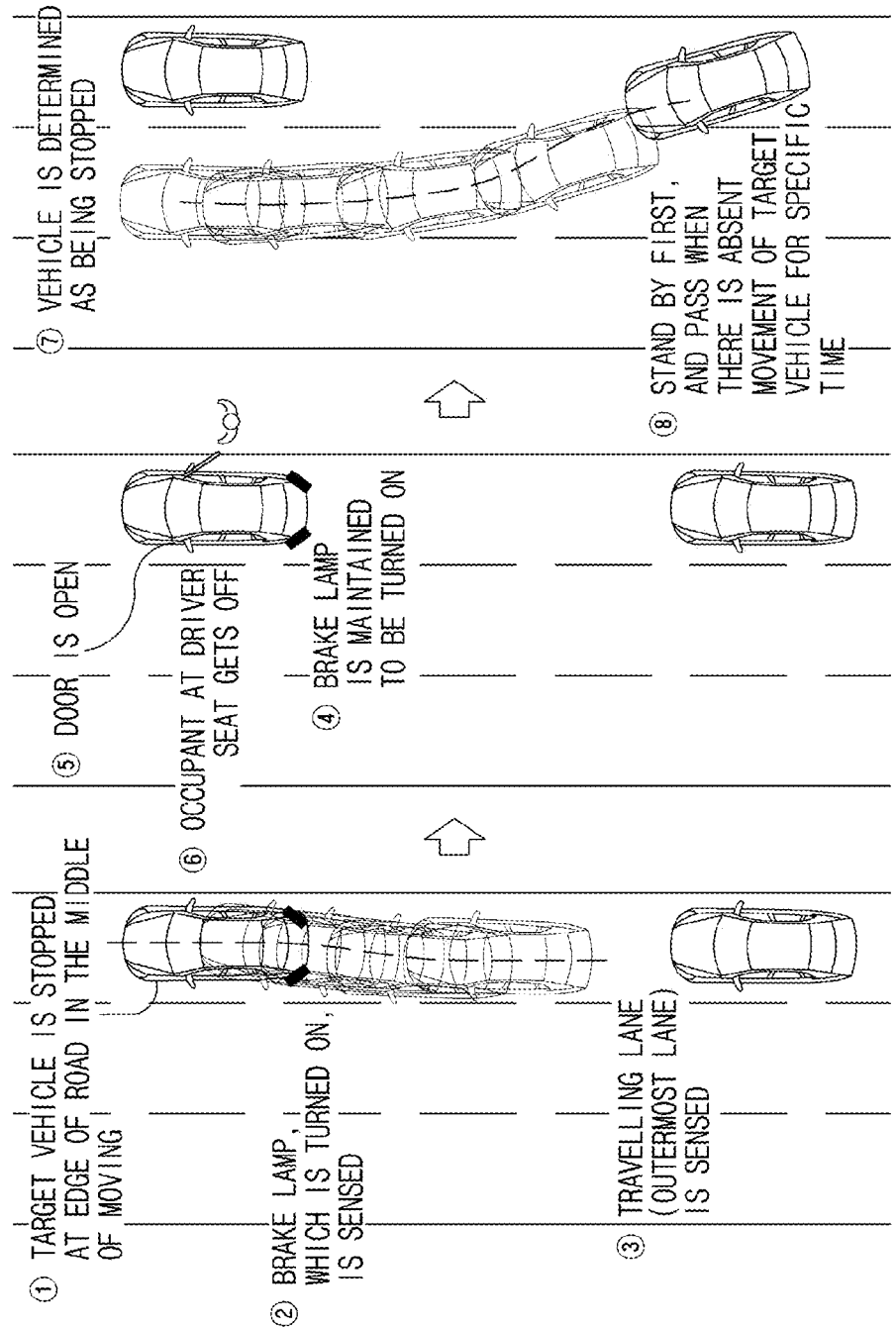

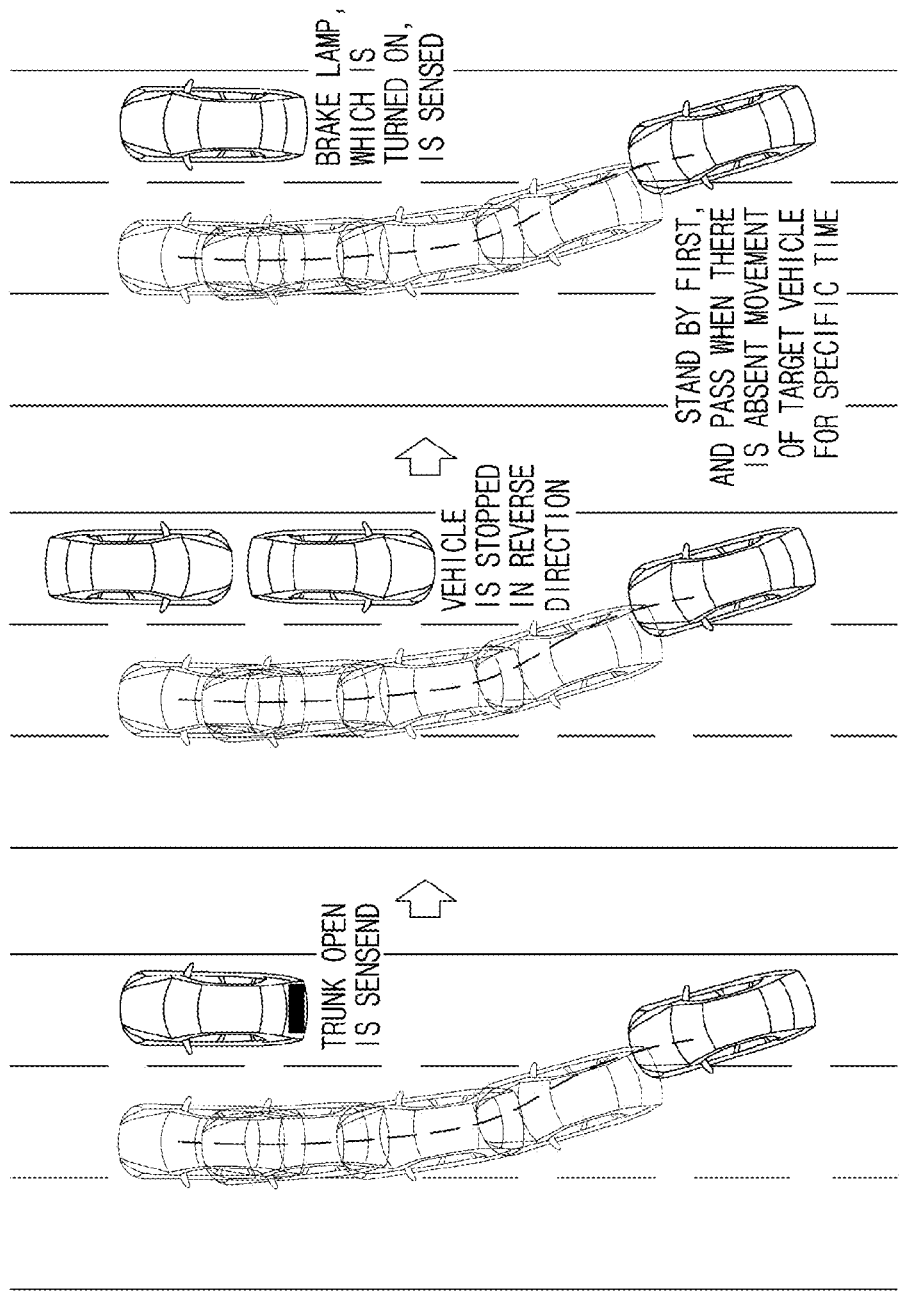

APPARATUS FOR CONTROLLING AUTONOMOUS DRIVING OF A VEHICLE, SYSTEM HAVING THE SAME AND METHOD THEREOF

CROSS-REFERENCE TO RELATED APPLICATION

This application claims priority to and the benefit of Korean Patent Application No. 10-2020-0041714, filed on Apr. 6, 2020, the entire contents of which are incorporated herein by reference.

FIELD

The present disclosure relates to an apparatus for controlling autonomous driving of a vehicle, a system having the same, and a method thereof.

BACKGROUND

The statements in this section merely provide background information related to the present disclosure and may not constitute prior art.

With the development of vehicle industry, an autonomous driving system and a driving assist system partially allowing autonomous driving (hereinafter, autonomous driving and driving assist are collectively referred to as "autonomous driving" for the convenience of explanation) have been developed.

The autonomous driving system may provide various functions such as maintaining a set speed, maintaining a distance between vehicles, maintaining a lane, and changing of a lane. The autonomous driving system may perform autonomous driving by using various devices such as a sensor to sense an external environment of a vehicle, a sensor to sense information about the vehicle, a global positioning system (GPS), a detailed map, a system for detecting the state of a driver, a steering actuator, an acceleration/deceleration actuator, a communication circuit, and a control circuit (e.g., an electronic control unit (ECU)).

We have discovered that when a front vehicle is stopped during such autonomous driving, a host vehicle continuously has to stand by until the front vehicle moves again. In this case, when the front vehicle is parked or stopped due to the intent of a driver instead of a traffic jam, the host vehicle has to stand by endlessly. Accordingly, the host vehicle needs to control (passing control) passing of the target vehicle by recognizing the situation.

SUMMARY

An aspect of the present disclosure provides an apparatus for controlling autonomous driving of a vehicle, capable of, when a target vehicle in front on a moving path in autonomous driving is stopped, controlling passing of the target vehicle by distinguishing among whether the target vehicle is stopped due to a traffic flow, parked vehicle, or temporarily stopped due to an accident or by a driver, a system having the same and a method thereof The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling autonomous driving may include: a processor to control autonomous driving, and a storage to store data and an algorithm to be executed by the processor to control the autonomous driving. The processor may determine whether a target vehicle which is in front of a host vehicle and traveling on a travelling lane of the host vehicle is stopped, and perform a passing control when the target vehicle is stopped.

According to one form, the processor may determine whether the target vehicle is stopped due to a traffic flow, temporarily stopped by a driver, or parked.

According to another form, the processor may determine whether the target vehicle is stopped in the middle of moving or has been already stopped from a time point at which the target vehicle is sensed by a sensor.

In one form, the processor may determine at least one of a position of a present travelling lane, whether a door of the target vehicle is open, and/or whether an occupant gets off the target vehicle, when the target vehicle is stopped in the middle of moving, to determine whether the target vehicle is stopped due to a traffic flow, temporarily stopped by a driver, or parked.

In another form, the processor may determine the target vehicle as being parked, when the position of the present travelling lane is an outermost lane of travelling lanes, when an occupant at a driver seat exits the target vehicle as a door on a side of the driver seat is open, and when a brake lamp is turned off.

In some forms of the present disclosure, the processor may determine the target vehicle as temporarily being stopped, when the position of the present travelling lane is an outermost lane of travelling lanes, when an occupant at a rear seat exits the target vehicle as a door on a side of the rear seat is open, and when a brake lamp is maintained to be turned on.

In some forms of the present disclosure, the processor may determine at least one of a position of a present travelling lane, a direction of a front/rear surface of the target vehicle, a tire alignment direction of the target vehicle, whether a trunk of the target vehicle is open, whether a side mirror of the target vehicle is open, and/or whether a lamp of the target vehicle is turned on, to determine whether the target vehicle is stopped due to a traffic flow, temporarily stopped by the driver, or parked, when the target vehicle has been already stopped.

In some forms of the present disclosure, the processor may determine the target vehicle as being parked, in at least one of when the target vehicle is in a reverse direction, when the trunk is open, when the side mirror is closed, when the tire alignment direction of the target vehicle is uniform, and/or when the lamp of the target vehicle is turned off, in a state that the position of the present travelling lane is the outermost lane of the travelling lanes.

In some forms of the present disclosure, the processor may immediately perform the passing control of the host vehicle when the target vehicle is parked.

In some forms of the present disclosure, the processor may perform the passing control of the host vehicle, when the target vehicle is determined as being temporarily stopped by the driver and continuously stopped even after the host vehicle stands by for a specific time.

In some forms of the present disclosure, the processor may control movement of the host vehicle, after the host vehicle stands by and the target vehicle moves when the target vehicle is determined as being stopped due to a traffic flow.

According to another aspect of the present disclosure, a system may include: a sensing device to sense a position of a host vehicle in a travelling lane and a target vehicle in front of the host vehicle, and a vehicle autonomous driving control apparatus to determine whether the target vehicle is stopped, based on sensing information of the sensing device, determine whether the target vehicle is stopped due to a traffic flow, temporarily stopped by a driver, or parked, and perform passing control depending on the determination result.

According to another form, the sensing device may include a camera to photograph the target vehicle, and a radar sensor to sense movement of the target vehicle.

According to other aspect of the present disclosure, a method for controlling autonomous controlling may include: determining whether a target vehicle, which is in front of a host vehicle and traveling in a travelling lane of the host vehicle, is stopped; determining whether the target vehicle is stopped due to a traffic flow, temporarily stopped by a driver, or parked, when the target vehicle is stopped; and performing passing control depending on the determination result.

In some forms of the present disclosure, the determining of whether the target vehicle is stopped may include determining whether the target vehicle is stopped in the middle of moving or has been already stopped from a time point at which the target vehicle is sensed by a sensor.

In some forms of the present disclosure, the determining of whether the target vehicle is temporarily stopped by the driver may include determining at least one of a position of a present travelling lane, whether a door of the target vehicle is open, and/or whether an occupant gets off the target vehicle, when the target vehicle is stopped in the middle of moving, to determine whether the target vehicle is stopped due to the traffic flow, temporarily stopped by the driver, or parked.

In some forms of the present disclosure, the determining of whether the target vehicle is temporarily stopped by the driver may include determining the target vehicle as being parked, when the position of the present travelling lane is an outermost lane of travelling lanes, when an occupant at a driver seat exits the target vehicle as a door on a side of the driver seat is open, and when a brake lamp is turned off.

In some forms of the present disclosure, the determining of whether the target vehicle is temporarily stopped by the driver may include determining the target vehicle as temporarily being stopped by the drier, when the position of the present travelling lane is an outermost lane of travelling lanes, when an occupant at a rear seat exits the target vehicle as a door on a side of the rear seat is open, and when a brake lamp is maintained to be turned on.

In some forms of the present disclosure, the method may further include determining at least one of a position of a present travelling lane, a direction of a front/rear surface of the target vehicle, a tire alignment direction of the target vehicle, whether a trunk of the target vehicle is open, whether a side mirror of the target vehicle is open, and/or whether a lamp of the target vehicle is turned on, to determine whether the target vehicle is stopped due to a traffic flow, temporarily stopped by the driver, or parked, when the target vehicle has been already stopped.

In some forms of the present disclosure, the method may further include determining the target vehicle as being parked, in at least one of when the target vehicle is in a reverse direction, when the trunk is open, when the side mirror is closed, when the tire alignment direction of the target vehicle is uniform, and/or when a lamp of the target vehicle is turned off, in a state that the position of the present travelling lane is the outermost lane of the travelling lanes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A, 4B and 4C are views illustrating passing control of a host vehicle when a target vehicle moving is stopped, according to one form of the present disclosure;

FIGS. 5A, 5B and 5C are views illustrating a screen in passing control of a host vehicle for a target vehicle which has been already stopped, according to another form of the present disclosure;

Figure 1:
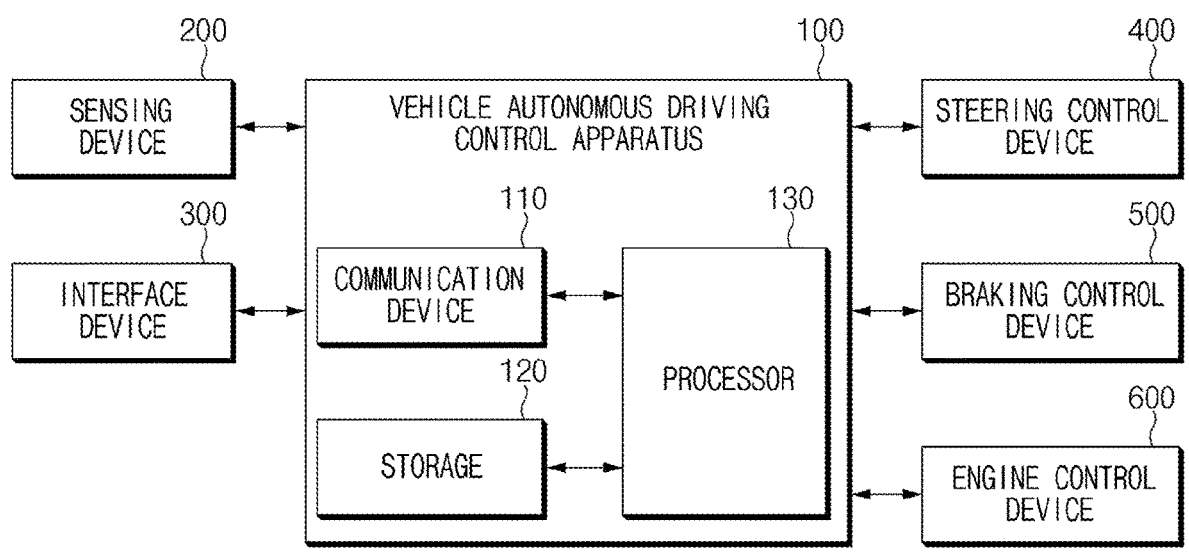
FIG. 1 is a block diagram illustrating components of a vehicle system including a vehicle autonomous driving control apparatus, in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to accompanying drawings. In addition, in the following description of exemplary forms of the present disclosure, a detailed description of well-known features or functions will be ruled out in order not to unnecessarily obscure the gist of the present disclosure.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application Hereinafter, exemplary forms of the present disclosure will be described in detail with reference to FIGS. 1 to 8.

FIG. 1 is a block diagram illustrating components of a vehicle system including an apparatus (hereinafter, referred to as "a vehicle autonomous driving control apparatus") for controlling autonomous driving of a vehicle, according to one form of the present disclosure.

Referring to FIG. 1, the vehicle system may include a vehicle autonomous driving control apparatus 100, a sensing device 200, an interface device 300, a steering control device 400, a braking control device 500, and an engine control device 600.

In some forms of the present disclosure, the vehicle autonomous driving control apparatus 100 may be implemented inside the vehicle. In this case, the vehicle autonomous driving control apparatus 100 may be formed integrally with the internal control units of the vehicle or may be implemented separately from the internal control units of the vehicle to be connected with the internal control units of the vehicle through a separate connector.

The vehicle autonomous driving control apparatus 100 may determine whether a target vehicle in front on a lane (travelling lane) on which a host vehicle is travelling is stopped, determine whether the target vehicle is stopped due to a traffic flow, temporarily stopped by a driver, or parked, and may perform passing control depending on the determination result. In this case, the target vehicle is a vehicle which is travelling in front, sensed by the sensing device 200 of the host vehicle, and selected. According to the present disclosure, a stop state of the target vehicle is determined based on a situation of the target vehicle and the passing control for the target vehicle is performed depending on the situation.

The vehicle autonomous driving control apparatus 100 may include a communication device 110, a storage 120, and a processor 130.

The communication device 110 is a hardware device implemented with various electronic circuits to transmit and receive a signal through wireless or wired connection. According to the present disclosure, the communication device 110 may make in-vehicle communication. In this case, the vehicle network communication technology may include a controller area network (CAN) communication technology, a local interconnect network (LIN) communication technology, a FlexRay communication technology, and in-vehicle communication may be performed through the above communication technology.

For example, the communication device 110 may make communication with the sensing device 200 and the interface device 300 to periodically receive sensing information from the sensing device 200.

The storage 120 may store the sensing result of the sensing device 200 and data and/or algorithms necessary for the processor 130 to operate. For example, the storage 150 may store information on an obstacle, such as the target vehicle, sensed by the sensing device 200.

The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The processor 130 may be electrically connected with the communication device 110 and the storage 120, and the like, may electrically control each component, and may be an electric circuit that executes software commands. Accordingly, the processor 130 may perform various data processing and calculation, to be described below.

The processor 130 may process signals transmitted between the components of the vehicle autonomous driving control apparatus 100. The processor 130 may be, for example, an electronic control unit (ECU), a micro controller unit (MCU), or another lower-level controller mounted in the vehicle The processor 130 may determine whether a target vehicle in front on the traveling lane of the host vehicle is stopped, determine whether the target vehicle is stopped due to a traffic flow, temporarily stopped by the driver, or parked, and may perform passing control depending on the determination result.

The processor 130 may determine whether the target vehicle is stopped in the middle of moving or has been already stopped from a time point at which the target vehicle is sensed by a sensor. In other words, the processor 130 may determine the target vehicle as being stopped in the middle of moving when the speed of the target vehicle travelling in front becomes '0', and may determine that the target vehicle has been already stopped when the speed of the target vehicle is '0' from a time point at which the target vehicle is sensed by the sensing device 200.

The processor 130 may determine at least one of a position of a present travelling lane, whether a door of the target vehicle is open, and/or whether an occupant gets off the target vehicle, when the target vehicle is stopped in the middle of moving, to determine whether the target vehicle is stopped due to the traffic flow, temporarily stopped by the driver, or parked.

In other words, the processor 130 may determine the target vehicle as being parked, when the position of the present travelling lane is the outermost lane of travelling lanes, when the occupant at a driver seat gets off the target vehicle as the door of the driver seat is open, and when a brake lamp is turned off. When the position of the present travelling lane is the outermost lane of the travelling lanes, when the occupant at the driver seat gets off the target vehicle as the door of the driver seat is open, and when an emergency lamp is maintained to be turned off, the processor 130 may determine the target vehicle as being temporarily stopped, even though the occupant gets off the driver seat. In this case, the outermost lane of the travelling lanes, which is a lane positioned farthest away from the central line and, may include the shoulder.

In addition, the processor 130 may determine that the target vehicle is temporarily stopped and stand by, when the occupant does not get off the target vehicle although the position of the present travelling lane is the outermost lane of the traveling lanes and the door of the target vehicle is open.

The processor 130 may determine that the target vehicle is temporarily stopped by the driver, when the position of the present travelling lane is the outermost lane of the traveling lanes, when an occupant at a rear seat gets off the target vehicle as a door at the side of the rear seat is open, and when the brake lamp is maintained to be turned on.

The processor 130 may determine at least one of the position of the present travelling lane, a direction of a front/rear surface of the target vehicle, a tire alignment direction of the target vehicle, whether a trunk of the target vehicle is open, whether a side mirror of the target vehicle is open, and/or whether a lamp of the target vehicle is turned on, to determine whether the target vehicle is stopped due to the traffic flow, temporarily stopped by the driver, or parked, when the position of the present travelling lane is the outermost lane of the travelling lanes, and when the target vehicle has been already stopped.

In other words, the processor 130 may determine the target vehicle as being parked, in at least one of when the target vehicle is in a reverse direction, when a trunk is open, when a side mirror is closed, when a tire alignment direction of the target vehicle is uniform, and/or when a lamp of the target vehicle is turned off, in the state that the position of the present travelling lane is the outermost lane of the travelling lanes.

The processor 130 may immediately perform the passing control of the host vehicle, when the target vehicle is determined as being parked.

The processor 130 may perform the passing control of the host vehicle when the target vehicle is determined as being temporarily stopped due to the accident or by the driver and continuously stopped even after the host vehicle stands by for a specific time.

In addition, the processor 130 may control the movement of the host vehicle, after the host vehicle stands by and the target vehicle moves when the target vehicle is determined as being stopped due to the traffic flow.

As described above, the processor 130 may determine whether the target vehicle is parked, temporarily stopped due to the intent of the driver, or stopped due to a traffic congestion, when the target vehicle in front is stopped, may stand by when the target vehicle is stopped due to the traffic congestion, and may continuously moves by passing the target vehicle when the target vehicle is parked or temporarily stopped due to the intent of the driver, thereby efficiently autonomous driving control.

The sensing device 200 senses the position of a lane by recognizing a present lane of a road on which the host vehicle is travelling. In addition, the sensing device 200 may sense the relative speed of the target vehicle in front, an On/Off state of a lamp (e.g., a brake lamp, an emergency lamp, a rear lamp, a front lamp) of the target vehicle, or a door open state, a trunk open state, an occupant getting-off state, or a front or rear state in the target vehicle.

To this end, the sensing device 200 may include a camera sensor and a laser sensor.

The interface device 300 may include an input device to receive a control command from a user and an output device to output the operation state and the operation result of the vehicle autonomous driving control apparatus 100.

In this case, the input device may include a key button, and may include a mouse, a joystick, a jog shuttle, a stylus pen, or the like. In addition, the input device may include a soft key implemented on a display The output device may include a display and may include a voice output device such as a speaker. When a touch sensor product, such as a touch film, a touch sheet, a touch pad, or the like, is included in the display, the display may operate as a touch screen, and the input device and the output device may be implemented in the integral form In this case, the display may include at least one of a liquid crystal display (LCD), a thin film transistor-liquid crystal display (TFT LCD), an organic light-emitting diode (OLED), a flexible display, a field emission display (FED), and/or a three dimensional display (3D display)

The steering control device 400 may be configured to control the steering angle of the vehicle, and may include a steering wheel, an actuator operating together with the steering wheel, and a controller to control the actuator The braking control device 500 may be configured to control the braking of the vehicle, and may include a controller to control a brake.

The engine control device 600 may be configured to control the engine driving of the vehicle, and may include a controller to control the speed of the vehicle As described above, according to the present disclosure, when there is present the target vehicle stopped in front on a moving path in autonomous driving, the engine control device 600 may determine whether to pass the target vehicle by distinguishing among whether the target vehicle is stopped due to the traffic flow, parked or stopped, or intentionally stopped due to an accident. Accordingly, when the target vehicle is determined as being intentionally stopped, the engine control device 600 may determine to pass the target vehicle and determine whether a lane change is possible and the passing control is performed.

Figure 2:
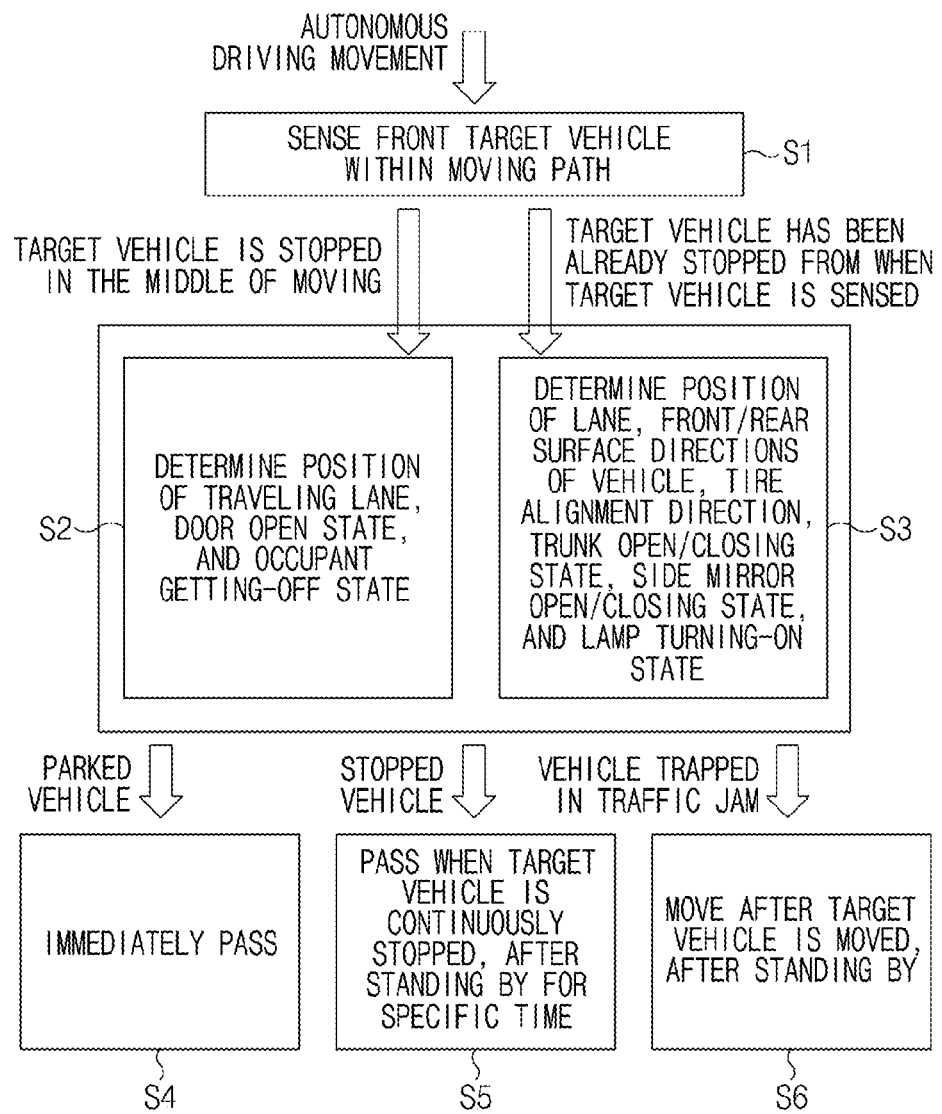
FIG. 2 is a view illustrating a procedure of performing passing control in a vehicle autonomous driving control apparatus, in one form of the present disclosure.

FIG. 2 is a view illustrating a procedure of determining to pass a target vehicle in a vehicle autonomous driving control apparatus, according to another form of the present disclosure.

The vehicle autonomous driving control apparatus 100 determines whether there is present a vehicle stopped in the middle of moving in front on the moving path of the host vehicle and selects the vehicle stopped in front on the moving path as a target vehicle (S1).

In this case, the vehicle autonomous driving control apparatus 100 may distinguish between whether the target vehicle is stopped in the middle of moving and whether the target vehicle has been already stopped from a time point at which the target vehicle is sensed by the sensing device 200 and determine the situations.

When the target vehicle is determined as being stopped during moving, the vehicle autonomous driving control apparatus 100 determines a parking state or a stop state of the target vehicle by integrally sensing at least one of a position of a travelling lane, whether a door (of a driver seat/passenger seat/rear seat) is open, whether an occupant gets off (from the driver seat/passenger seat/rear seat), and/or the change of a lamp, through a front camera of the sensing device 200 (S2).

In addition, when the target vehicle has been already stopped from the time point at which the target vehicle is sensed by the sensing device 200, the vehicle autonomous driving control apparatus 100 determines the parking state or the stop state of the target vehicle by integrally sensing at least one of the position of the travelling lane, a direction of a front or rear surface of the vehicle, a tire alignment direction, whether the trunk is open, whether a side mirror is open and/or whether a lamp is turned on, through the front camera sensor of the sensing device 200 (S3).

When the target vehicle is determined as being parked, the vehicle autonomous driving control apparatus 100 may select the target vehicle as a target vehicle to be passed, may immediately try to change a lane, and may pass the target vehicle (S4).

In addition, when the target vehicle is determined as being stopped, the vehicle autonomous driving control apparatus 100 may stand by for a specific time. Then, when the target vehicle is continuously stopped, the vehicle autonomous driving control apparatus 100 may pass the target vehicle by selecting the target vehicle as a target vehicle to be passed and trying to change a lane.

In addition, the vehicle autonomous driving control apparatus 100 may stand by for a specified time when the target vehicle is determined as being stopped due to the traffic congestion, and then, may control the host vehicle to move when the target vehicle is moved (S6).

Figures 3A, 3B, 3C:
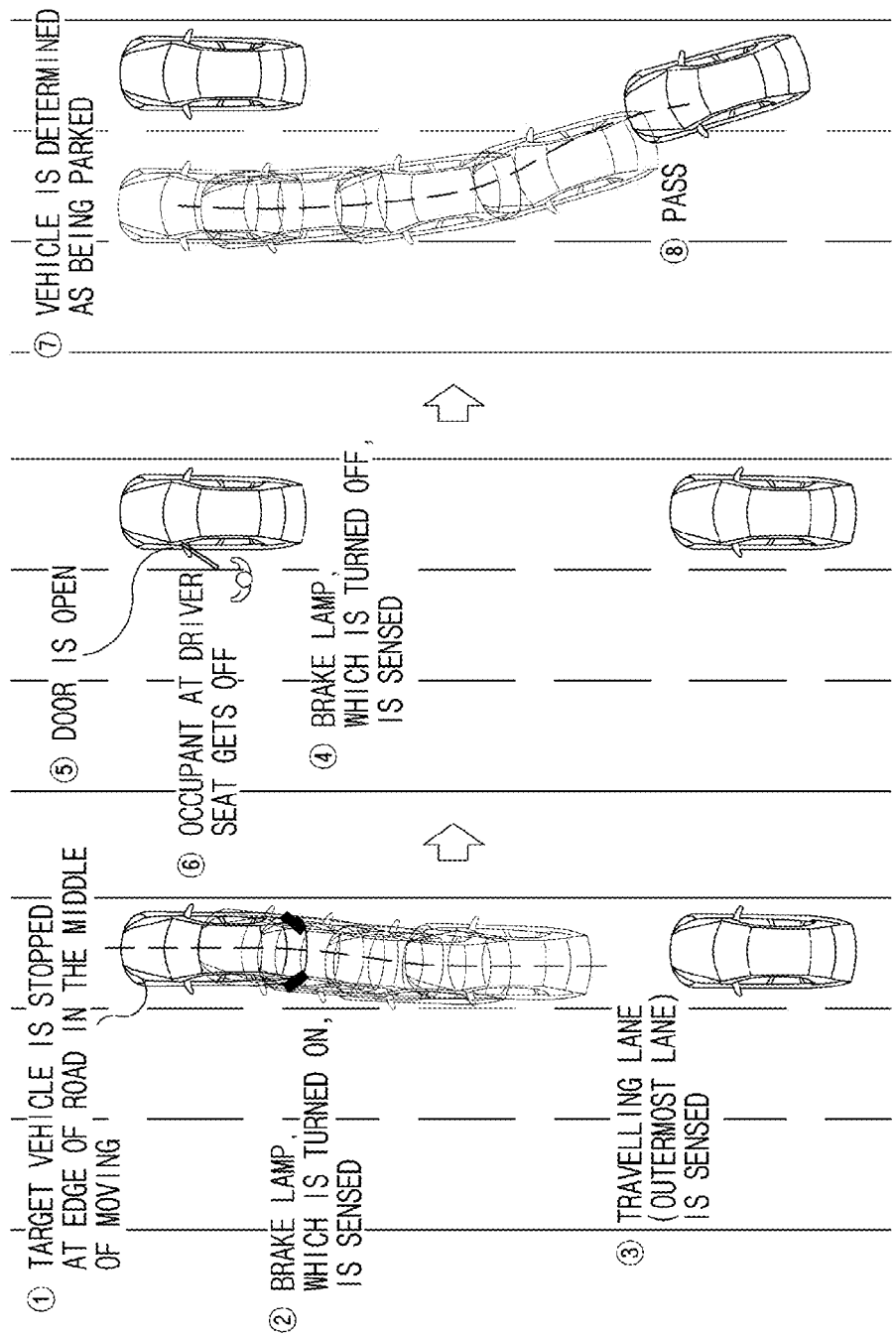
FIGS. 3A, 3B and 3C are views illustrating passing control of a host vehicle when a target vehicle moving is stopped, in one foim of the present disclosure.

FIGS. 3A, 3B and 3C are views illustrating passing control of a host vehicle when a target vehicle is stopped in the middle of moving, according to one form of the present disclosure.

Referring to FIG. 3A, the vehicle autonomous driving control apparatus 100 selects, as a target vehicle, a front vehicle which is travelling in front on a travelling path of the host vehicle during travelling and monitors the target vehicle. Thereafter, when the target vehicle moves to an edge of a road and then stops, the vehicle autonomous driving control apparatus 100 determines whether the brake lamp of the target vehicle is turned on. When the brake lamp of the vehicle is determined as being turned on, the vehicle autonomous driving control apparatus 100 determines whether the travelling lane of the host vehicle is the outermost lane by tracking a lane through a front camera sensor.

Referring to FIG. 3B, the vehicle autonomous driving control apparatus 100 determines whether the brake lamp is turned off, based on the sensing information of the target vehicle, and determines whether the door of the target vehicle is open when the brake lamp is turned off. Thereafter, the vehicle autonomous driving control apparatus 100 determines whether an occupant at the driver seat gets off the target vehicle, based on a camera and a radar sensor present in the front of the hos vehicle Referring to FIG. 3C, when the occupant at the driver seat gets off the target vehicle after turning off the brake lamp of the target vehicle, the vehicle autonomous driving control apparatus 100 determines the target vehicle as being parked and immediately performs passing control.

FIGS. 4A, 4B and 4C are views illustrating passing control of a host vehicle when a target vehicle is stopped in the middle of moving, according to one form of the present disclosure.

Referring to FIG. 4A, the vehicle autonomous driving control apparatus 100 monitors a front vehicle which is travelling in front on a travelling path of the host vehicle during travelling by selecting the front vehicle as the target vehicle. Thereafter, when the target vehicle moves an edge of a road and is stopped, the vehicle autonomous driving control apparatus 100 determines whether the brake lamp of the target vehicle is turned on. When the brake lamp of the target vehicle is determined as being turned on, the vehicle autonomous driving control apparatus 100 determines whether the travelling lane of the host vehicle is the outermost lane by tracking a lane through a front camera sensor.

Referring to FIG. 4B, the vehicle autonomous driving control apparatus 100 determines whether a door at the side of a passenger seat opposite to the driver seat of the target vehicle is open while the brake lamp of the target vehicle is turned on. Thereafter, the vehicle autonomous driving control apparatus 100 determines whether an occupant at a passenger seat or a rear seat gets off the target vehicle, based on the sensing results of the front camera and the radar sensor. In this case, the vehicle autonomous driving control apparatus 100 may determine whether the target vehicle is temporarily stopped by a driver, by determining whether the occupant at the passenger seat or the rear seat gets off the target vehicle, in the state that an emergency lamp is turned off instead of the brake lamp turned on.

Referring to FIG. 4C, when the occupant at the passenger seat or rear seat gets off the target vehicle in the state that the brake lamp of the target vehicle is maintained to be turned on, the vehicle autonomous driving control apparatus 100 determines the target vehicle as a vehicle temporarily stopped by the driver, stands by for a specified time, and controls the movement of the host vehicle when the target vehicle moves. To the contrary, the vehicle autonomous driving control apparatus 100 performs the passing control of the host vehicle when the target vehicle does not move for a specified time.

FIGS. 5A, 5B and 5C are views illustrating a screen for passing control of a host vehicle for a target vehicle which has been already stopped, according to one form of the present disclosure.

Referring to FIG. 5A, when there is present a target vehicle which has been already stopped in front on the travelling lane of the host vehicle, the vehicle autonomous driving control apparatus 100 determines whether the trunk of the target vehicle is open. When determining that the trunk of the target vehicle is open, the vehicle autonomous driving control apparatus 100 determines the target vehicle as being parked and immediately perform the passing control.

Referring to FIG. 5B, the vehicle autonomous driving control apparatus 100 may determine the target vehicle as being parked when determining that there is present a head lamp in a direction facing the target vehicle, and when the travelling lane is the outermost lane, and may immediately perform the passing control.

Referring to FIG. 5C, the vehicle autonomous driving control apparatus 100 may determine the target vehicle as being parked and perform the passing control when a tail lamp of the target vehicle is recognized and the brake lamp of the target vehicle is turned off, and when the target vehicle does not move after the host vehicle stands by for a specified time.

Figure 6:
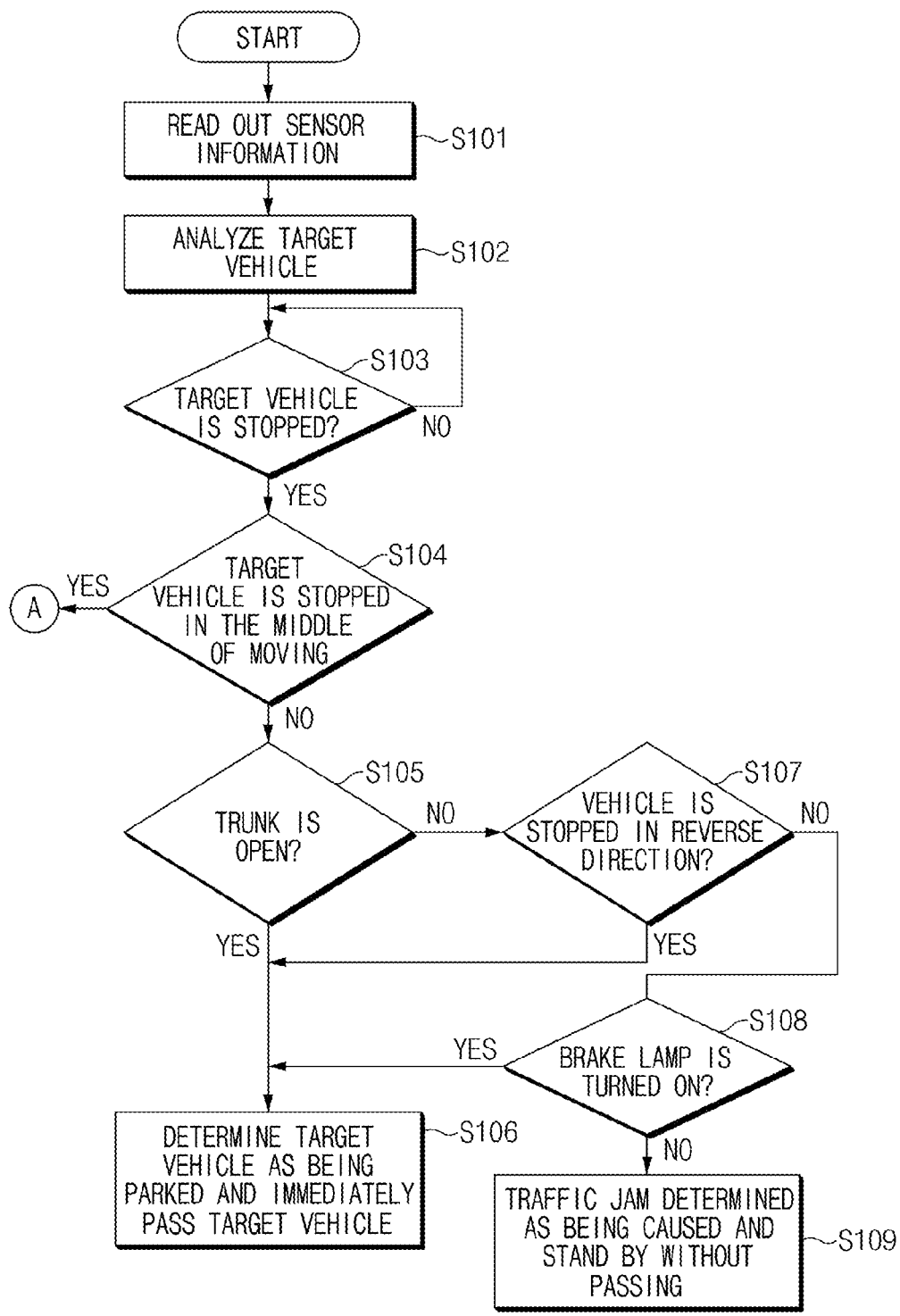
FIG. 6 is a flowchart illustrating a method for controlling autonomous driving, in one form of the present disclosure.

Hereinafter, a method for controlling autonomous driving will be described with reference to FIG. 6. FIG. 6 is a flowchart illustrating the method for controlling the autonomous driving according to another form of the present disclosure.

The following description will be made on the assumption that the vehicle autonomous driving control apparatus 100 of FIG. 1 performs a process of FIG. 6. In addition, in the following description made with reference to FIG. 6, it may be understood that operations described as being performed by the apparatus are controlled by the processor 130 of the vehicle autonomous driving control apparatus 100.

Referring to FIG. 6, the vehicle autonomous driving control apparatus 100 reads out sensing information received from the sensing device 200 (S101).

The vehicle autonomous driving control apparatus 100 selects the target vehicle based on the sensing information and analyzes the sensing information on the target vehicle (S102).

The vehicle autonomous driving control apparatus 100 determines whether the target vehicle is stopped (S103) and determines whether the target vehicle is stopped in the middle of moving, when the target vehicle is sopped (S104).

When the target vehicle has been already stopped before sensed, instead of that the target vehicle is stopped in the middle of moving, the vehicle autonomous driving control apparatus 100 determines whether the trunk of the target vehicle is open (S105).

When the trunk of the target vehicle is open, the vehicle autonomous driving control apparatus 100 determines the target vehicle as being parked and immediately perform the passing control (S106).

Meanwhile, when the trunk of the target vehicle is closed, the vehicle autonomous driving control apparatus 100 determines whether the target vehicle is stopped in a reverse direction, by determining whether a tail lamp or a headlamp of the target vehicle is present (S107). In other words, the vehicle autonomous driving control apparatus 100 may determine that the target vehicle is stopped in the reverse direction, when the headlamp of the target vehicle is sensed.

When the trunk of the target vehicle is open, the vehicle autonomous driving control apparatus 100 determines the target vehicle as being parked and immediately perform the passing control (S106).

To the contrary, when the target vehicle is stopped in the reverse direction, the vehicle autonomous driving control apparatus 100 determines whether the brake lamp is turned on (S108).

When the brake lamp is turned on, the vehicle autonomous driving control apparatus 100 determines the target vehicle as being parked and immediately perform the passing control (S106).

When the brake lamp is not turned on or the emergency lamp is turned off, the vehicle autonomous driving control apparatus 100 determines that the target vehicle is stopped due to the traffic congestion and stands by without passing the target vehicle (S109).

Figure 7:
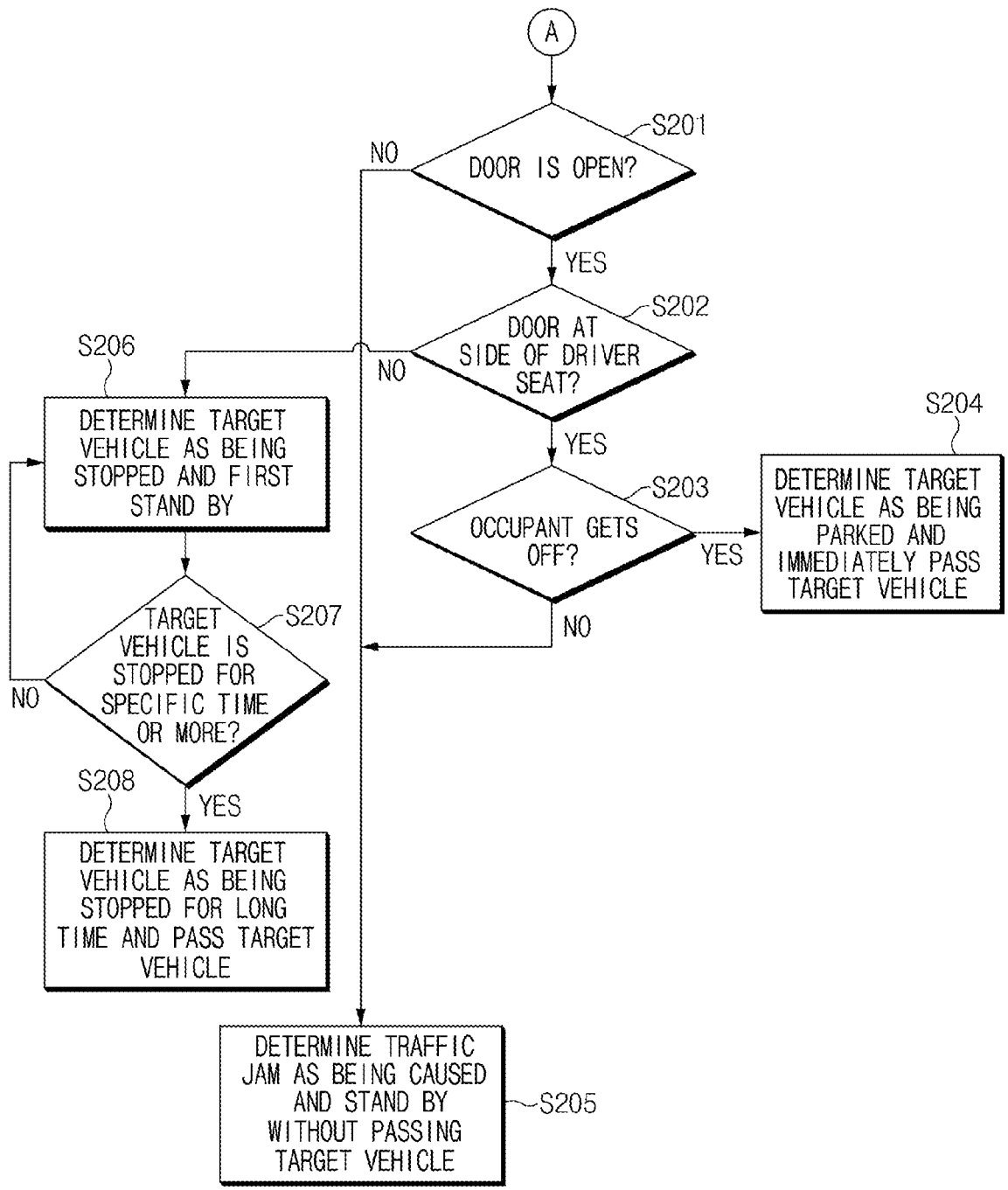
FIG. 7 is a flowchart illustrating a method for controlling autonomous driving, according to another form of the present disclosure.

Hereinafter, a method for controlling autonomous driving will be described with reference to FIG. 7 in detail. FIG. 7 is a flowchart illustrating the method for controlling the autonomous driving, according to one form of the present disclosure.

The following description will be made on the assumption that the vehicle autonomous driving control apparatus 100 of FIG. 1 performs a process of FIG. 7. In addition, in the following description made with reference to FIG. 7, it may be understood that operations described as being performed by an apparatus are controlled by the processor 130 of the vehicle autonomous driving control apparatus 100. The following description made with reference to FIG. 7 is regarding the subsequent procedure when the target vehicle is stopped in the middle of moving in S104 of FIG. 6.

Referring to FIG. 7, the vehicle autonomous driving control apparatus 100 determines whether the door of a target vehicle in front is open (S201).

When the door of the target vehicle in front is not open, the vehicle autonomous driving control apparatus 100 determines that the target vehicle is stopped due to the traffic jam (traffic congestion) and stands by without passing the target vehicle (S205).

To the contrary, when the door of the target vehicle is open, the vehicle autonomous driving control apparatus 100 determines whether the open door is a door at the side of the driver seat, based on the sensing information (S202). When the door at the side of the driver seat of the target vehicle is open, the vehicle autonomous driving control apparatus 100 determines whether an occupant gets off the target vehicle, based on the sensing information (S203).

When the occupant of the driver seat does not get off the target vehicle, the vehicle autonomous driving control apparatus 100 determines that the target vehicle is stopped due to the traffic jam and stands by without passing the target vehicle (S205).

To the contrary, when the occupant at the driver seat gets off the target vehicle, the vehicle autonomous driving control apparatus 100 determines the target vehicle as being parked and immediately perform the passing control (S204).

Meanwhile, when the door at the side of the driver seat is not open in S202, the vehicle autonomous driving control apparatus 100 determines the target vehicle as being stopped and stands by (S206).

Thereafter, the vehicle autonomous driving control apparatus 100 determines whether the target vehicle is stopped for a specific time or more (S207). When the target vehicle is stopped for a specific time or more, the vehicle autonomous driving control apparatus 100 determines the target vehicle as being stopped for a long time and performs the passing control (S208).

Figure 8:
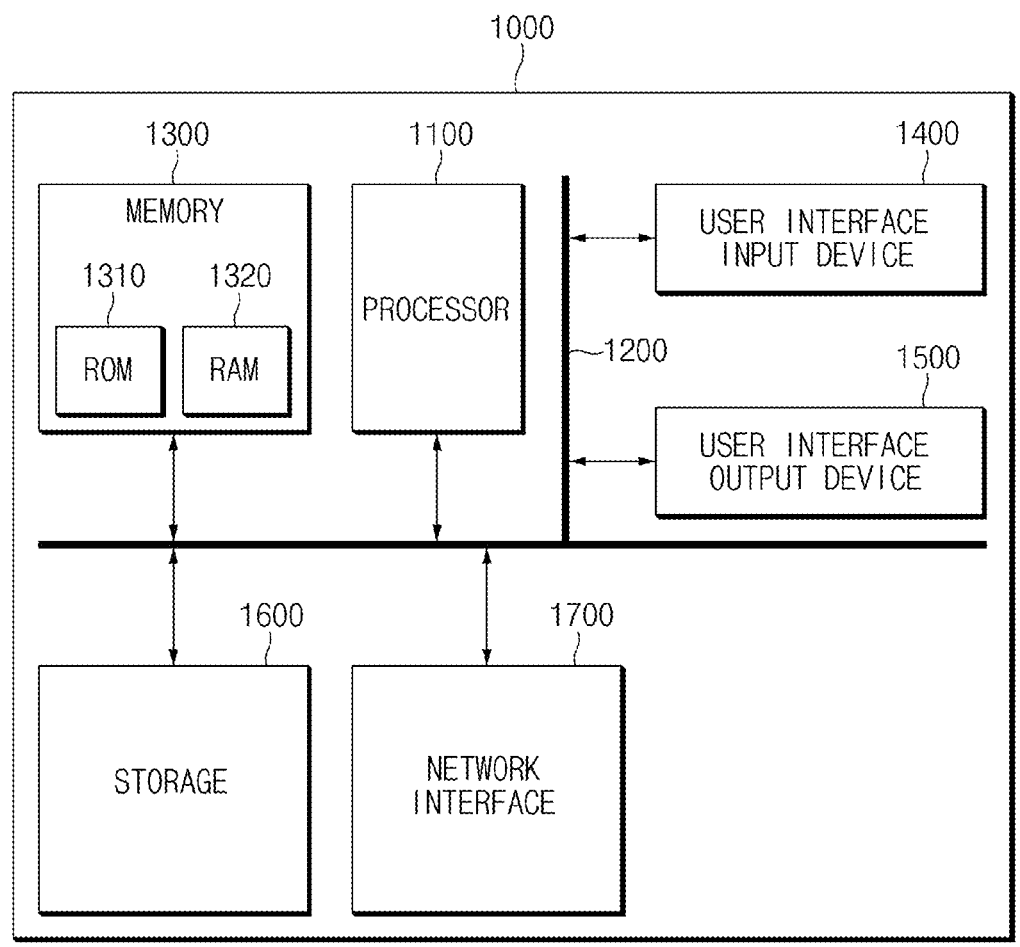
FIG. 8 illustrates a computing system, according to one form of the present disclosure.

FIG. 8 illustrates a computing system, according to one form of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

According to the present disclosure, when the target vehicle in front on the moving path of the host vehicle in autonomous driving is stopped, the passing of the target vehicle may be controlled by distinguishing among whether the target vehicle is stopped due to the traffic flow, parked, or temporarily stopped due to the accident or by the driver.

Besides, a variety of effects directly or indirectly understood through the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms.

What is claimed is:

1. An apparatus for controlling autonomous driving of a vehicle, the apparatus comprising:
a processor configured to control autonomous driving; and
a storage configured to store data and an algorithm to be executed by the processor to control the autonomous driving,
wherein the processor is configured to:
determine whether a target vehicle is stopped, where the target vehicle is in front of a host vehicle and travelling in a travelling lane of the host vehicle;
when the target vehicle is stopped, further determine whether the target vehicle is temporarily stopped after a speed of the target vehicle is decreased, or whether the target vehicle has been already stopped since a time point at which the target vehicle is sensed by a sensor;
when the target vehicle is temporarily stopped after the speed of the target vehicle is decreased, determine whether the target vehicle is stopped due to a traffic flow, temporarily stopped by a driver of the target vehicle, or parked; and
perform a passing control based on determining whether the target vehicle is stopped due to the traffic flow, temporarily stopped by the driver, or parked.

2. The apparatus of claim 1, wherein the processor is configured to:
when the target vehicle is determined as being temporarily stopped after the speed of the target vehicle is decreased, determine at least one of a position of a present travelling lane, whether a door of the target vehicle is open, or whether an occupant exits the target vehicle.

3. The apparatus of claim 2, wherein the processor is configured to
determine that the target vehicle is parked, when the position of the present travelling lane is an outermost lane of travelling lanes, when an occupant at a driver seat exits the target vehicle as a door on a side of the driver seat is open, and when a brake lamp is turned off.

4. The apparatus of claim 2, wherein the processor is configured to:
determine that the target vehicle is temporarily stopped, when the position of the present travelling lane is an outermost lane of travelling lanes, when an occupant on a rear seat exits the target vehicle as a door on a side of the rear seat is open, and when a brake lamp is maintained to be turned on.

5. The apparatus of claim 1, wherein the processor is configured to:
determine whether to immediately perform the passing control based on at least one of a position of a present travelling lane, a direction of a front/rear surface of the target vehicle, a tire alignment direction of the target vehicle, whether a trunk of the target vehicle is open, whether a side mirror of the target vehicle is open, or whether a lamp of the target vehicle is turned on, when the target vehicle has been already stopped.

6. The apparatus of claim 5, wherein the processor is configured to:
determine that the target vehicle is parked based on at least one of followings: the target vehicle is in a reverse direction; the trunk is open; the side mirror is closed; the tire alignment direction of the target vehicle is uniform; or the lamp of the target vehicle is turned off, in a state that the position of the present travelling lane is in an outermost lane of travelling lanes.

7. The apparatus of claim 1, wherein the processor is configured to:
immediately perform the passing control of the host vehicle when the target vehicle is parked.

8. The apparatus of claim 1, wherein the processor is configured to:
perform the passing control of the host vehicle, when the target vehicle is determined as being temporarily stopped by the driver and continuously stopped even after the host vehicle stands by for a specific time.

9. The apparatus of claim 1, wherein the processor is configured to:
control movement of the host vehicle, after the host vehicle stands by and the target vehicle moves when the target vehicle is determined as being stopped due to the traffic flow.

10. A system comprising:
a sensing device configured to sense a position of a host vehicle in a travelling lane and a target vehicle in front of the host vehicle; and
a vehicle autonomous driving control apparatus configured to:
determine whether the target vehicle is stopped, based on sensing information from the sensing device;
when the target vehicle is stopped, further determine whether the target vehicle is temporarily stopped after a speed of the target vehicle is decreased, or whether the target vehicle has been already stopped since a time point at which the target vehicle is sensed by a sensor;
when the target vehicle is temporarily stopped after the speed of the target vehicle is decreased, determine whether the target vehicle is stopped due to a traffic flow, temporarily stopped by a driver, or parked; and
perform a passing control based on determining whether the target vehicle is stopped due to the traffic flow, temporarily stopped by the driver, or parked.

11. The system of claim 10, wherein the sensing device includes:
a camera configured to photograph the target vehicle; and
a radar sensor configured to sense movement of the target vehicle.

12. A method for controlling autonomous driving, the method comprising:
determining, by a processor, whether a target vehicle is stopped, where the target vehicle is in front of a host vehicle and traveling in a travelling lane of the host vehicle,
wherein determining whether the target vehicle is stopped includes:
determining whether the target vehicle is temporarily stopped after a speed of the target vehicle is decreased, or whether the target vehicle has been already stopped since a time point at which the target vehicle is sensed by a sensor;
in response to determining that the target vehicle is temporarily stopped after the speed of the target vehicle is decreased, determining, by the processor, whether the target vehicle is stopped due to a traffic flow, temporarily stopped by a driver, or parked; and
performing, by the processor, a passing control based on determining whether the target vehicle is stopped due to the traffic flow, temporarily stopped by the driver, or parked.

13. The method of claim 12, further comprising:
when the target vehicle is temporarily stopped after the speed of the target vehicle is decreased, determining at least one of a position of a present travelling lane, whether a door of the target vehicle is open, or whether an occupant exits the target vehicle.

14. The method of claim 13, wherein determining whether the target vehicle is temporarily stopped by the driver includes:
determining that the target vehicle is parked, when the position of the present travelling lane is an outermost lane of travelling lanes, when an occupant at a driver seat exits the target vehicle as a door on a side of the driver seat is open, and when a brake lamp is turned off.

15. The method of claim 13, wherein determining whether the target vehicle is temporarily stopped by the driver includes:
determining that the target vehicle is temporarily stopped by the driver, when the position of the present travelling lane is an outermost lane of travelling lanes, when an occupant at a rear seat exits the target vehicle as a door on a side of the rear seat is open, and when a brake lamp is maintained to be turned on.

16. The method of claim 12, further comprising:
determining, by the processor, at least one of a position of a present travelling lane, a direction of a front/rear surface of the target vehicle, a tire alignment direction of the target vehicle, whether a trunk of the target vehicle is open, whether a side mirror of the target vehicle is open, or whether a lamp of the target vehicle is turned on, and determining, by the processor, whether the target vehicle is stopped due to the traffic flow, temporarily stopped by the driver, or parked, when the target vehicle has been already stopped.

17. The method of claim 16, further comprising:
determining, by the processor, that the target vehicle is parked based on at least one of followings: the target vehicle is in a reverse direction; the trunk is open; the side mirror is closed; when the tire alignment direction of the target vehicle is uniform; or a lamp of the target vehicle is turned off, in a state that the position of the present travelling lane is in an outermost lane of travelling lanes.

\* \* \* \* \*